(12) United States Patent
Smits et al.

(10) Patent No.: US 10,575,475 B2
(45) Date of Patent: Mar. 3, 2020

(54) ILLUMINATION DEVICE FOR STIMULATING PLANT GROWTH

(71) Applicant: NGES Holding, B.V., Nuenen (NL)

(72) Inventors: Johannes Jacobus Smits, Hoek van Holland (NL); Wilhelmus Petrus Van Vliet, Nuenen (NL)

(73) Assignee: NEXT GENERATION ENERGY SOLUTIONS B.V., Nuenen (NL)

( * ) Notice: Subject to any disclaimer, the term of this patent is extended or adjusted under 35 U.S.C. 154(b) by 765 days.

(21) Appl. No.: 14/779,020

(22) PCT Filed: Mar. 21, 2014

(86) PCT No.: PCT/NL2014/000013
§ 371 (c)(1),
(2) Date: Sep. 22, 2015

(87) PCT Pub. No.: WO2014/148888
PCT Pub. Date: Sep. 25, 2014

(65) Prior Publication Data
US 2016/0057944 A1 Mar. 3, 2016

(30) Foreign Application Priority Data
Mar. 22, 2013 (NL) .................................... 1040116

(51) Int. Cl.
*A01G 9/26* (2006.01)
*F21V 23/00* (2015.01)
(Continued)

(52) U.S. Cl.
CPC ............... *A01G 9/26* (2013.01); *A01G 7/045* (2013.01); *F21V 23/009* (2013.01);
(Continued)

(58) Field of Classification Search
CPC ........ A01G 9/26; A01G 7/045; F21V 23/009; F21V 29/71; F21V 29/763
See application file for complete search history.

(56) References Cited

U.S. PATENT DOCUMENTS

| | | | |
|---|---|---|---|
| 7,674,012 B1* | 3/2010 | Lin | ....................... F21V 29/004 362/240 |
| 8,092,050 B2* | 1/2012 | Hou | ....................... F21V 29/004 362/218 |

(Continued)

FOREIGN PATENT DOCUMENTS

| | | |
|---|---|---|
| WO | 2007147242 A1 | 12/2007 |
| WO | 2010140171 A1 | 12/2010 |
| WO | 2011117778 A1 | 9/2011 |

OTHER PUBLICATIONS

International Search Report in related PCT/NL2014/000013 dated Jun. 13, 2014.

*Primary Examiner* — Anabel Ton
(74) *Attorney, Agent, or Firm* — Troutman Sanders LLP; Ryan Schneider

(57) ABSTRACT

An assimilation lamp device (1) for stimulating plant and crop growth comprises a central lamp unit (10), comprising a body (14) and a plurality of LEDs (12) mounted to an under surface of the body (14), wherein the body (14) is made of a thermally well conducting material, for instance aluminum, and acts as a heat sink for the heat generated by the LEDs. The body (14) is provided with cooling fins or lamellae (41). The assimilation lamp device further comprises air stream generating means (42) such as a fan for generating a downward air stream (43) in heat exchanging contact with the cooling fins or lamellae, so that heat is removed from the respective cooling block and used to increase the temperature of said downward air stream (43).

17 Claims, 5 Drawing Sheets

(51) Int. Cl.
  *F21V 29/67* (2015.01)
  *F21V 29/71* (2015.01)
  *F21V 29/76* (2015.01)
  *A01G 7/04* (2006.01)
  *F21Y 115/10* (2016.01)

(52) U.S. Cl.
  CPC ............ *F21V 29/673* (2015.01); *F21V 29/71* (2015.01); *F21V 29/763* (2015.01); *F21Y 2115/10* (2016.08); *Y02A 40/274* (2018.01)

(56) References Cited

U.S. PATENT DOCUMENTS

| | | | | |
|---|---|---|---|---|
| 8,608,352 | B2* | 12/2013 | Tsai | F21V 29/20 313/46 |
| 8,684,565 | B2* | 4/2014 | Lopez | F21V 29/02 362/249.02 |
| 8,939,617 | B2* | 1/2015 | Kim | F21V 29/77 362/294 |
| 2006/0133090 | A1* | 6/2006 | Noh | G02F 1/133603 362/294 |
| 2009/0288340 | A1 | 11/2009 | Hess | |
| 2009/0316425 | A1* | 12/2009 | Inoue | F21S 48/325 362/547 |
| 2011/0075433 | A1* | 3/2011 | Mart | F21V 21/30 362/427 |
| 2011/0183368 | A1 | 7/2011 | Chapman | |
| 2013/0003382 | A1 | 1/2013 | Ohura | |
| 2013/0077293 | A1* | 3/2013 | Lee | F21V 29/677 362/184 |
| 2014/0043810 | A1* | 2/2014 | Jo | F21V 13/04 362/235 |
| 2014/0211478 | A1* | 7/2014 | Park | F21V 29/02 362/294 |
| 2015/0198321 | A1* | 7/2015 | Druchinin | H05B 33/0803 362/235 |
| 2016/0290608 | A1* | 10/2016 | Ohashi | F21V 29/677 |
| 2016/0369994 | A1* | 12/2016 | Liu | F21V 29/677 |
| 2017/0184297 | A1* | 6/2017 | Yu | F21V 29/673 |

* cited by examiner

ILLUMINATION DEVICE FOR STIMULATING PLANT GROWTH

CROSS-REFERENCE TO RELATED APPLICATIONS

This application is a US National Stage of International Application No. PCT/NL2014/000013, filed 21 Mar. 2014, which claims the benefit of NL1040116, filed 22 Mar. 2013, both herein fully incorporated by reference.

FIELD OF THE INVENTION

The present invention relates in general to the field of plant growth, specifically but not exclusively the field of large-scale commercially growing plants for production.

BACKGROUND OF THE INVENTION

In greenhouses, crop like tomatoes, cucumber, pepper, or more in general plants, are cultivated for an optimal yield. It is a general desire that crop grows as fast as possible in order to be able to harvest as early as possible and to obtain a commercial value as high as possible. Apart from nutrients, the most important growth factors are water, air (with a substantial percentage of carbon dioxide), temperature, and light, and a commercial plant grower will try to control these factors to some optimum values.

SUMMARY OF THE INVENTION

In modern greenhouses, artificial illumination as part of creating an optimal set of conditions for the stimulation of crop or ornamental plant growth is quite common. Especially when sun light is fading and/or periods of daylight are getting shorter, like in autumn and winter season, artificial illumination of plants is essential for obtaining good growth. Such artificial illumination is also indicated as "assimilation lighting".

Light sources can be considered as sources of energy. This energy is emitted by means of photons with different wavelengths (blue to red, respectively 300-700 nanometres), which are used by plants for photo syntheses. However, not every wavelength is efficient for crop growth. The photo syntheses creates nutrients required for growth.

The type of artificial illumination depends on the application, e.g. stimulation of crop growth, ripening of crop fruits, root stimulation etc, or simply type of crop. Mostly, high or low pressure gas discharge lamps (sodium lamps) are used for assimilation lighting. However, these lamps have a limited lifespan of typical 6 months to one year and therefore need regular replacement. Further, these lamps consume a lot of energy, typically 600 W to 1000 W for approximately 10 square meters of crop. Unfortunately, the energy to light conversion rate is quite low: only a few percent of the energy input is converted into usable light (photons), and the remaining energy is converted into heat and usually lost in the ridge of the greenhouse where it is of no use for crop. The excess heat must be discharged by ventilating the greenhouse in order to keep temperature at a optimal level.

This waste of energy (heat and energy consumption) is not acceptable anymore for economic, environmental and sustainability reasons. Also the limited lifetime of gas discharge lamps puts an economic pressure on business, mainly, but not only, because of labour costs for replacement.

In order to avoid these disadvantages, a system for stimulating plant growth has been developed that comprises light sources based on a different technology, i.e. LEDs. Light Emitting Diodes (LEDs) have all kinds of advantages, including compact size, high efficiency, and long life expectancy. In principle, an LED generates light within a narrow spectral range only but, in contrast to the sodium lamp whose narrow spectral range is fixed, it is possible to design an LED such that it generates its light output in a desired spectral range. Of course, it is possible to combine LEDs of different types, each generating light in mutually different spectral ranges, to obtain an overall light output having a certain desired spectral distribution.

The present invention aims to further elaborate on the LED technology to optimize an illumination system for stimulating plant growth.

Especially when compared to incandescent lamps, which generate much light in non-useful spectral regions including infrared, LEDs are very efficient light generators. Nevertheless, the LED bodies dissipate energy, and especially in the case of high-power LEDs, cooling of the LEDs is necessary in order to prevent damage of the LEDs. It is customary that such cooling is done by using cooling water. This, however, involves a large system of water pipes or hoses with associated costs and risks of leakage. Further, the water is not heated to temperatures high enough for the heated water to be able to be used effectively for heating purposes, so in practice the used cooling water including its heat content is discarded as waste. Another disadvantage is that water cooling for LED-lamps is quite elaborate and cumbersome, for reasons of leakage, lamp replacement, change of lamp configuration, etc.

On the other hand, for optimum grow conditions of the plants involved, it is necessary to keep the temperature within the greenhouse at a certain level, which in many cases requires that the air in the greenhouse is heated and that the heated air is transported (blown) to the plants. This requires an air heating system that, in respect of capacity, needs to be designed for coping with an expected "coldest case scenario".

The present invention aims to use the heat generated by the LEDs in a more efficient manner, contributing to the growth of the plants involved. This not only will use the energy consumption of the LEDs more efficiently but will also reduce the requirements for a heating system, leading to a further reduction of cost.

The present invention further aims to establish a more turbulent microclimate and consequently a more homogeneous environment for crop in terms of gas mixture and temperature. Among other things, this will bring the advantage of making more efficient use of extra doses of carbon dioxide, which are released in the greenhouses to stimulate growth.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
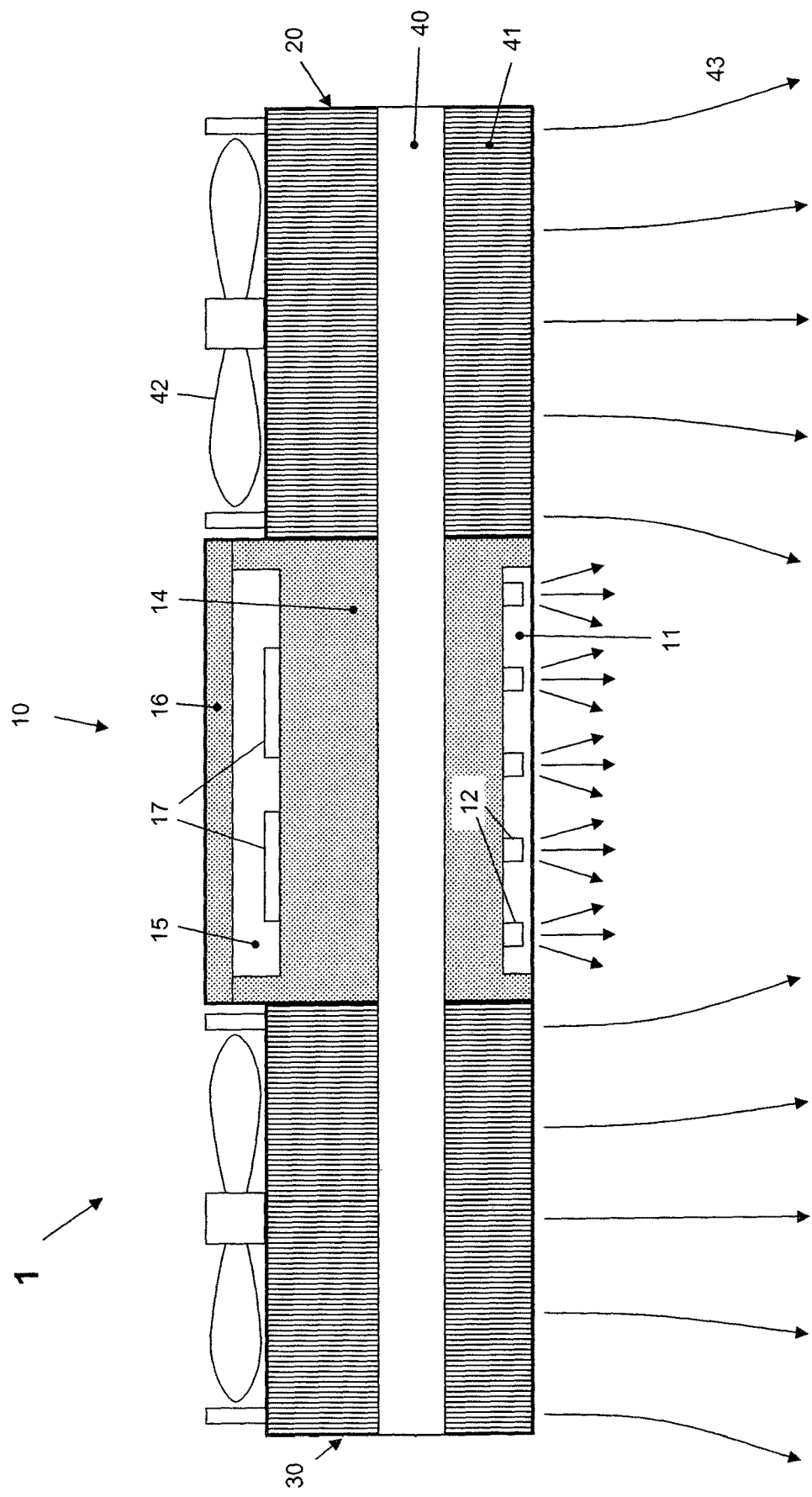
FIG. 1 schematically shows a longitudinal cross section of a first exemplary embodiment of an assimilation lamp device according to the present invention.

FIG. 1 schematically shows a first embodiment of a compact and relatively low cost assimilation lamp device 1 according to the present invention. The lamp device 1 comprises a central lamp unit 10 which includes a body 14 of a general rectangular block shape. The lamp device 1 further comprises a plurality of LEDs 12 mounted to an under surface of the body 14, preferably in a recessed portion 11 thereof. At its upper side, the body 14 has a cabinet 15 accomodating driving and control circuitry 17 for the LEDs, suitably covered by a lid 16. The cabinet 15 will receive an electric supply cable for electrical supply, but this is not shown for sake of simplicity. The driving and control circuitry 17 generates driving current or the LEDs 12, which current is transported to the LEDs via conductors extending through the body 14, but this too is not shown for sake of simplicity.

The LEDs may be selected to emit light in (different) parts of the 300-700 nm spectrum. A 300W lamp version emits approximately 200 µmol/s, compared to a 600 W gas discharge sodium lamp which emits approximately 140 µmol/s. In this respect, a mol indicates a number of photons, 1 mol being Avogadro's number, i.e. $6.02 \times 10^{23}$.

The LEDs 12 are mounted to have a good thermal conduction towards the body 14. The body 14 is made of a thermally well conducting material, for instance aluminum. Thus, the body 14 acts as a heat sink for the heat generated by the LEDs. This in any case has the effect that the temperature of the LED's remains at such a level that the lifetime of the LED's is not affected.

In simple and/or low power embodiments, such heat sinking may be sufficient for keeping the LEDs junction temperature within operative ranges. The body 14 will transfer its heat to the ambient air, which may be assisted by fins on the outer body surface for improved heat-exchanging contact surface and heat radiation surface. Heated air may rise to the ridge of the greenhouse, so that a convective air flow is generated that cools the body 14. In this case, however, the energy content of the warm air is lost to the outer environment.

However, in a preferred embodiment, the lamp device comprises a fan 42 or any other type of air stream generating means for generating a downward air stream 43, as well as heat transfer and exchange means 20; 30 for transferring heat from the body 14 to the air stream 43, so that the air stream cools the body 14 and the heat from the LEDs 12 is used to warm said downward air stream 43. This warm air stream 43 ultimately reaches the plants, so that all in all the heat generated by the LEDs is not a loss any more but is advantageously used to warm the environment of the plants.

The invention can be implemented in several ways. Two possible embodiments are illustrated in the drawings and will be discussed below.

For enhanced heat-exchanging contact with the air stream 43, the body 14 is in either of these embodiments provided with at least one ribbed and/or finned heat exchanger structure. This structure may be attached to the body 14, but may also be formed integrally with the body 14.

In the first embodiment of FIG. 1, the heat exchanger structure is arranged at a side surface of the body 14. Most preferably, as shown, the body 14 is provided with two such heat exchanger structures 20, 30 arranged opposite each other. The heat exchanger structures 20, 30 may have a plurality of cooling fins or lamellae 41 arranged in a vertical direction, having the advantage that a good heat exchanging contact is possible between said downward air stream 43 and the heat exchanger structures 20, 30. A fan 42 arranged above each heat exchanger structure 20, 30 can generate a downflow that can be heated and flow down almost without hindrance. In the second embodiment 2, which will be discussed in more detail later, the heat exchanger structure (s) is/are arranged above the body 14.

While the body 14 primarily functions to carry the LEDs and to draw heat away from the LEDs in a vertical direction, the heat exchanger structure 20, 30 functions to draw away heat from the body 14, allowing the body 14 to draw away more of the LED heat, and to exchange the heat with the air flow. In the first embodiment, the heat exchanger structure 20, 30 draws away heat from the body 14 in a horizontal direction, while in the second embodiment the heat exchanger structure 20, 30 draws away heat from the body 14 in a vertical direction. For the heat transfer from body 14 to heat exchanger structure 20, 30, the heat exchanger structure 20, 30 may be just mounted in heat transferring surface contact, but it is also possible that the body 14 and the heat exchanger structure 20, 30 are provided with separate heat conductors or even heat pipes to promote the transfer of heat from body 14 to heat exchanger structure 20, 30.

By way of example, FIG. 1 shows an embodiment of a heat conductor 40 as a horizontal bar made from aluminium. The heat exchanger structures 20, 30, which are preferably made from aluminium, include a plurality of cooling fins or lamellae 41 extending in virtual planes substantially perpendicular to the heat conductor 40, i.e. vertical planes, at a mutual distance sufficient for allowing a vertical air flow between such fins. Again, heat exchange with the ambient air might cause a convective air flow that is directed upwards, just for cooling the heat exchanger structures 20, 30. However, in the most preferred embodiment, each heat exchanger structure 20, 30 is provided with a respective fan 42 (or similar air stream generating means), for generating a downward air stream 43. The air stream interacts with the respective heat exchanger structure, and heat is exchanged from said heat exchanger structure to the air so that the heat exchanger structure is cooled by the air and the air is warmed by the heat exchanger structure. Such air stream is directed to the plants (not shown) below the lamps, and when the air stream reaches soil level it is deflected into a horizontal direction, distributing warm air over a larger surface area. In the preferred embodiment shown, the fan 42 is mounted on an upper surface of the respective heat exchanger structure, i.e. the heat exchanger structure is arranged downstream of the respective fan.

Such a setup has the ultimate advantage that the LED-generated heat is not only transported away from the LEDs but is actually used to improve grow conditions for the plants. The fans 42 generate a vertical warm air circulation flow in the greenhouse, which in turn drives a horizontal warm air flow where the warm air flow is used to warm the leaves of the plants instead of being lost in the ridges of the greenhouse due to natural convection.

Therefore, the assimilation lamp 1 as proposed by the present invention is very energy efficient, since all energy input is used to enable crop growth, by illumination as well as by temperature support.

Figure 2:
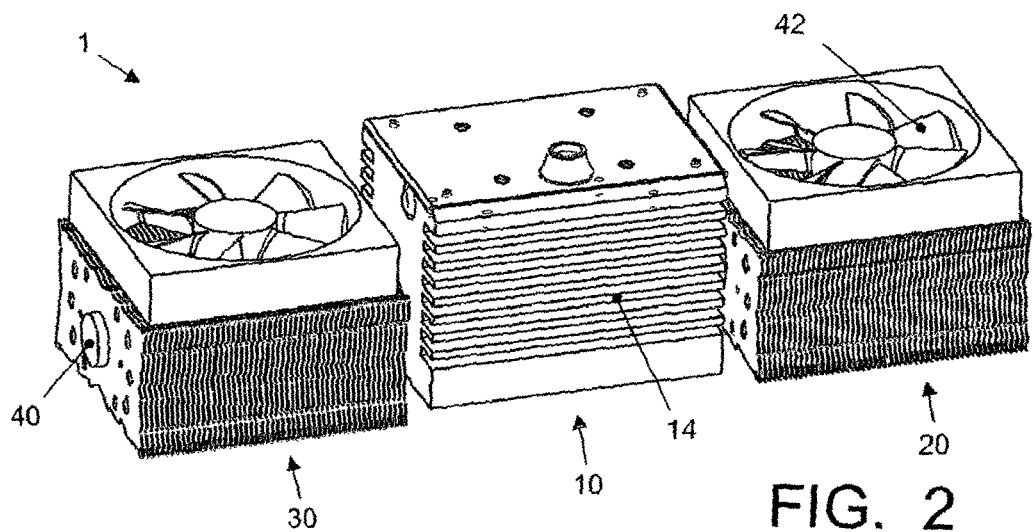
FIG. 2 is a schematic perspective top view of the assimilation lamp of FIG. 1.
Figure 3:
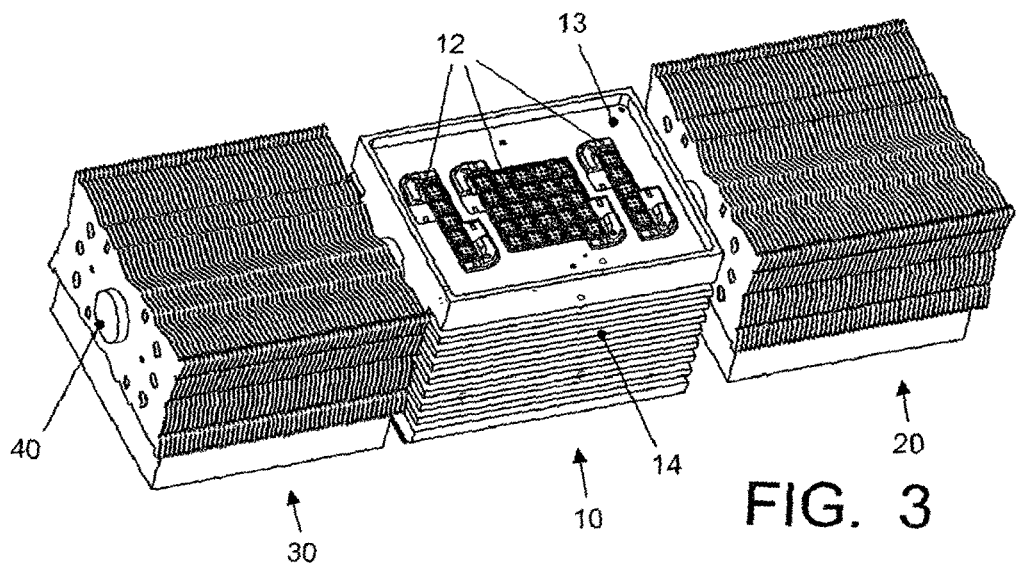
FIG. 3 is a schematic perspective bottom view of the assimilation lamp of FIG. 1.

FIG. 2 is a schematic perspective top view of the first embodiment of the assimilation lamp 1, showing the heat exchanger structures 20, 30 detached from the body 14. FIG. 3 is a similar perspective bottom view of the first embodiment of the assimilation lamp 1. These figures illustrate the modular setup of the assimilation lamp 1, which enables the application of different type of LED sizes or wavelengths. The modular lamp design enables an easy down or up scaling in terms of LED light power (Watts), dependent on the application. Further it is possible to exchange LED units within a few minutes, e.g. to replace a defective LED or to change the application of the lamp (different wavelengths) because of different crop or plant species.

Figure 4:
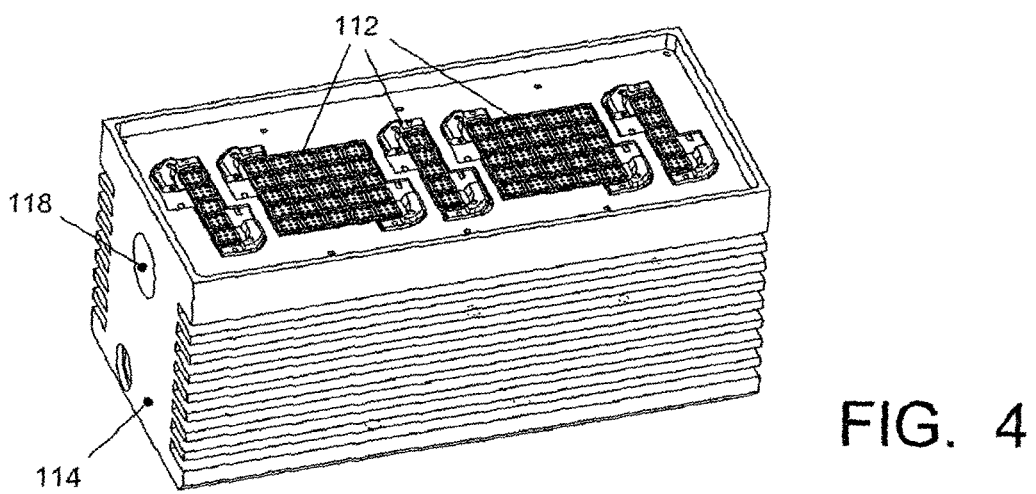
FIG. 4 is a schematic perspective bottom view of the lamp body on a larger scale.

FIG. 4 is a schematic perspective bottom view of an alternative lamp body 114 on a larger scale. With respect to the embodiment of FIG. 3, this alternative lamp body 114 is larger and accommodates more LEDs 112. Yet, the modular design of this alternative lamp body 114 is the same as the design as lamp body 14 in the sense that the same heat exchanger structures 20, 30 can be used in combination with this alternative lamp body 114. FIG. 4 further shows a through-hole 118 for receiving a heat conductor 40.

Figure 5:
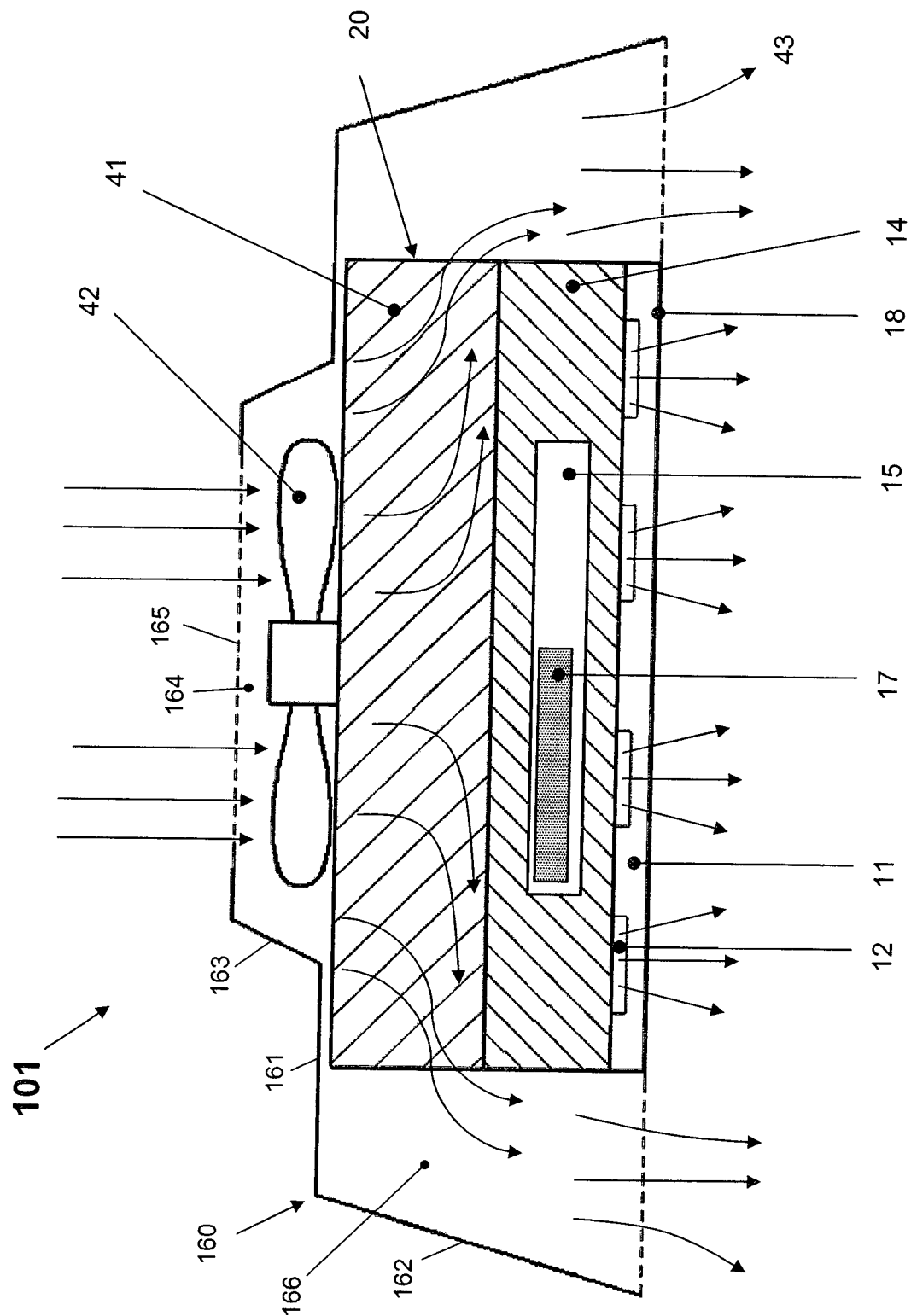
FIG. 5 schematically shows a longitudinal cross section of a second exemplary embodiment of an assimilation lamp device according to the present invention.

FIG. 5 schematically shows a longitudinal view of a cross section of a second embodiment of the assimilation lamp 101. Different from the first embodiment, the heat exchanger structure 20 is arranged at a top surface of the body 14. Instead of one heat exchanger structure 20 having substantially the same size as the body 14, it is also possible to have two or more smaller heat exchanger structures.

In this second embodiment of the assimilation lamp 101, a fan 42 is arranged above the heat exchanger structure 20; alternatively, it is possible to have two or more fans. The fan 42 is arranged to generate a vertical air flow towards the heat exchanger structure 20, but in contrast to the first embodiment the air flow is blocked by the body 14 and is deflected in a horizontal direction. The precise horizontal direction is determined by the design of the heat exchanger structure 20.

Figure 6A:
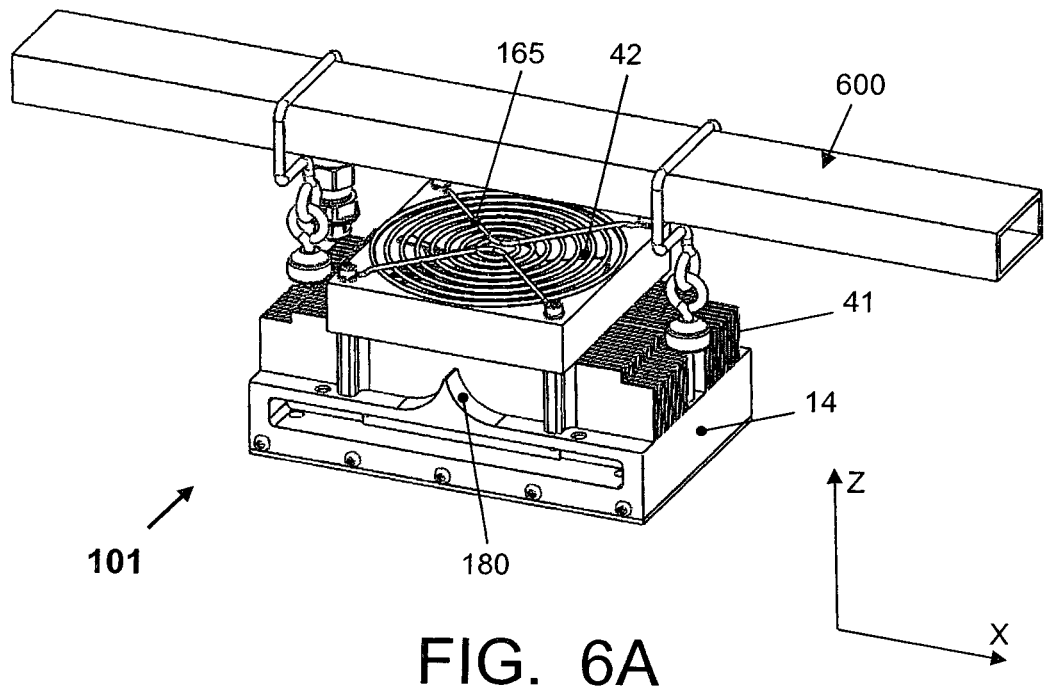
FIG. 6A is a schematic perspective top view of the assimilation lamp of FIG. 5, with the lamp cover removed.

The heat exchanger structure 20 comprises a plurality of relatively thin cooling fins or lamellae 41 that in between them define flowing paths for the air. FIG. 6A is a perspective top view of the assimilation lamp 101, suspended from a greenhouse beam 600, where it can be seen that the fins or lamellae 41 are all mutually parallel and extend in XZ-planes, with the X-direction parallel to the longitudinal direction of the assimilation lamp 101 which in practice will coincide with the longitudinal direction of the beam 600. In such case, the air flow leaving the heat exchanger structure 20 will be directed in the X-direction. While this in principle would be sufficient for the purpose of cooling the LEDs alone, it does not result in the beneficial downflow of warm air towards the plants.

To assure the downwards air stream 43, this second embodiment of the assimilation lamp 101 comprises a guiding hood 160 having a substantially inverse-U shaped profile with a top wall 161 and substantially vertical side walls 162. At its underside, the hood 160 is open. The top wall 161 has a raised portion 163 having a central opening 164, provided with a protective grating 165. Under the opening 164, surrounded and protected by the raised wall portion 163, the fan 42 is arranged. The top wall 161 lies in close proximity to the upper side of the fins or lamellae 41, so that in operation air is sucked in via the opening 164 and is forced to pass between the body 14 and the top wall 161 of the hood 160, following in X-direction the flow channels between the fins or lamellae 41. In this X-direction, the hood 160 is wider than the body 14, so that a collective flow path is defined between the side walls 162 and the body 14 where the air can do nothing else but flow down in vertical direction, to exit the device at the underside of the hood 160, which may be flush with or lower than the lower surface of body 14. It is noted that, in X-direction, the fins or lamellae 41 may have the same size as the body 14, as shown, but it is also possible that these fins or lamellae may extend as far as to meet the hood side walls 162.

Figure 6B:
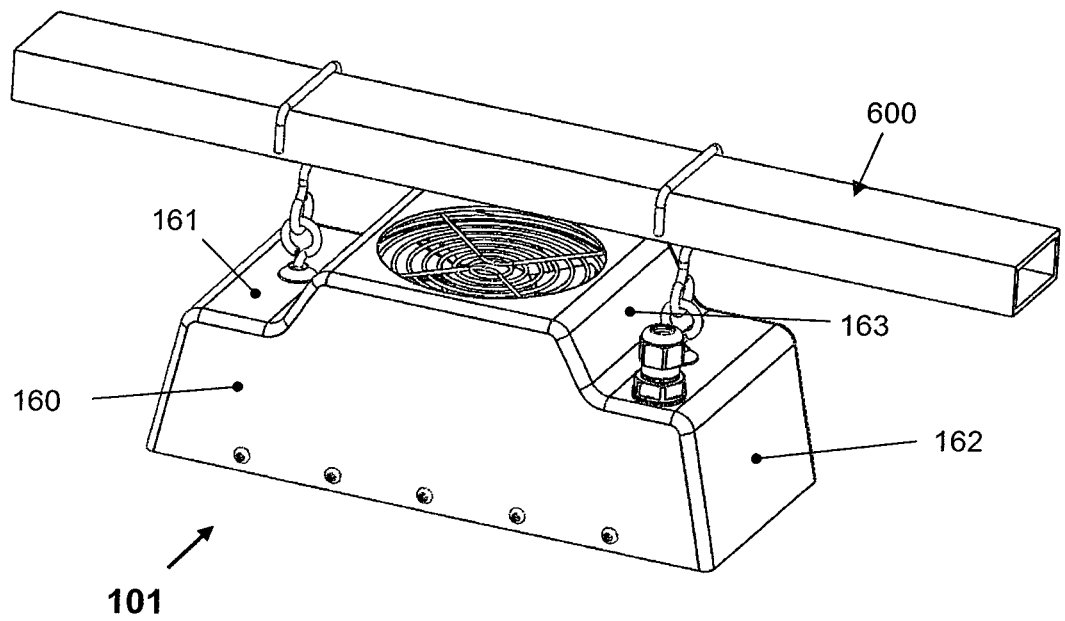
FIG. 6B is a schematic perspective top view of the assimilation lamp of FIG. 5, including the lamp cover.
Figure 7:
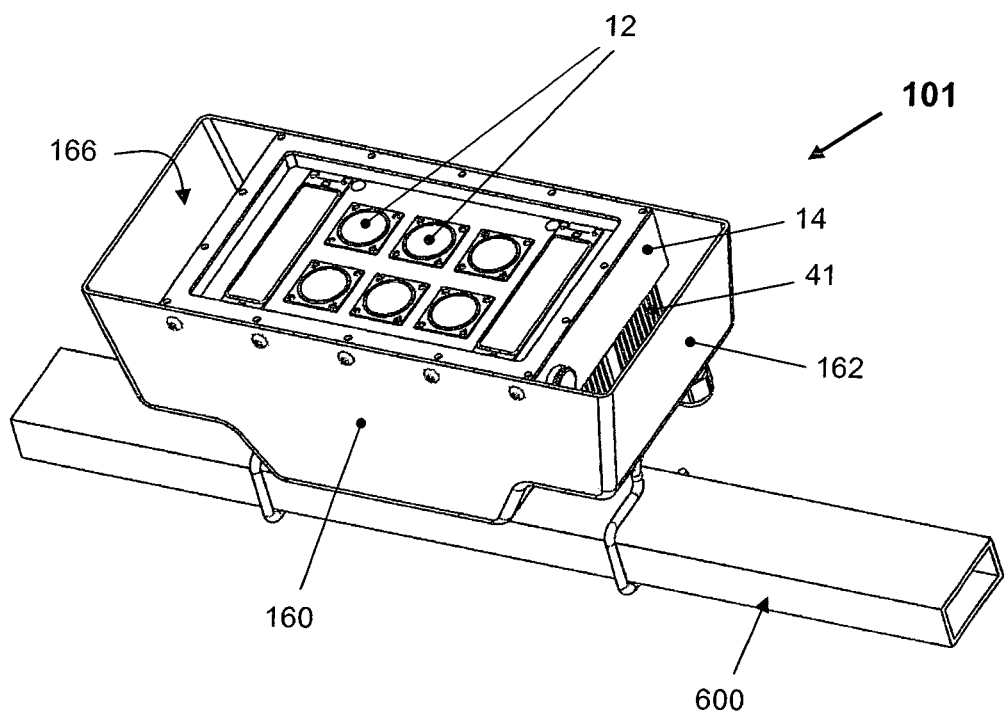
FIG. 7 is a schematic perspective bottom view of the assimilation lamp of FIG. 5.

In practice, the assimilation lamp 1; 101 will typically be mounted in a greenhouse at a height between 3 and 6 meters. The greenhouse typically includes a construction frame having horizontal beams 600 of a certain width. In such greenhouse, the exposure of the crop to daylight (sunlight) should be maximised as much as possible, therefore shadow should be kept at a minimum. In this respect, it is of great advantage that the lamp according to the present invention has a slender construction and profile, with a width substantially corresponding to the width of the construction beam or only slightly larger. Thus, the present invention also provides a greenhouse design where an assimilation lamp device 1; 101 is mounted under a construction beam 600, having its longitudinal direction aligned with the longitudinal direction of the construction beam 600, as illustrated in FIGS. 6A, 6B, and 7.

An advantage of the assimilation lamp 101 of FIG. 5, as compared to the embodiment of FIG. 1, is that the overall lamp can be much more compact. However, it is inevitable that the air is deflected to follow a Z-shaped path, and this may be a source of additional noise. This can be a serious issue, considering that in practice, in a standard greenhouse, about 1000 assimilation lamps will be used per hectare. The noise can be reduced by incorporating one or more air stream guides, which are curved surfaces defining a smooth air flow path for redirecting the air flow. An example of such air stream guide 180 is shown in FIG. 6A.

Thus, for stimulating plant and crop growth, the present invention provides an assimilation lamp device 1 that comprises a central lamp unit 10, comprising a body 14 and a plurality of LEDs 12 mounted to an under surface of the body 14, wherein the body 14 is made of a thermally well conducting material, for instance aluminum, and acts as a heat sink for the heat generated by the LEDs. The body 14 is provided with cooling fins or lamellae 41.

The assimilation lamp device further comprises air stream generating means 42 such as a fan for generating a downward air stream 43 in heat exchanging contact with the cooling fins or lamellae, so that heat is removed from the respective cooling block and used to increase the temperature of said downward air stream 43.

It should be clear to a person skilled in the art that the present invention is not limited to the exemplary embodiments discussed above, but that several variations and modifications are possible within the protective scope of the invention as defined in the appending claims. For instance, two or more functions may be performed by one single entity, unit or processor. Even if certain features are recited in different dependent claims, the present invention also relates to an embodiment comprising these features in common. Any reference signs in a claim should not be construed as limiting the scope of that claim.

The central lamp body 14 preferably has such dimensions that an electronic cabinet 15 can be made to integrate additional functionality while the slender profile of the assimilation lamp 1 is maintained. Besides the possible storage of a power supply which drives the LEDs and the eventually present LEDs, also other features can be installed. Possibilities are the installation of one or more sensors and sensor controllers in order to enhance the functionality of the assimilation lamp. E.g. a daylight sensor which can adjust the total amount of emitted light output of the LEDs as function of the available daylight. The amount of daylight can e.g. vary due to the season, or locally present clouds or mist. Further, an enhanced daylight sensor can, if required, even adjust the emitted light spectrum of the emitted LED-light, by controlling the light or colour output power balance between the available LEDs, assuming that different colours can be emitted by the assimilation lamp. Controlling and tuning the available different colours of the lamp allows the horticulturist or fruiter e.g. to mimic sunrise and/or sunset or to tune the light spectrum based on the demands of a particular crop. In case the assimilation lamps operate in a grid (which is normally the case in greenhouses), it is sufficient to provide e.g. only 1 out of 5 or 10 lamps with a smart sensor system, since the information acquired by this system can be used to control the other 4 or 9 passive assimilation lamps. In fact this creates a master-slave situation which reduces costs with a benefit in performance.

Other possibilities are the application of a sensor which can measure the amount of available carbon dioxide or a sensor which is able to determine the level of humidity. Based on sensor input and a response algorithm, the light output of one or more LED's of the lamp can be adjusted in such a way that the yield of crop or plants is accelerated.

The assimilation lamp is preferably equipped with a monitoring system that monitors critical lifetime affecting parameters like lamp body temperature (close to LED junction), outliers of power supply current and voltage. Further the total operational time of the lamp is monitored. Monitoring the lamp temperature (more precisely: the junction temperature) is important, since a high temperature significantly affects the LED lifetime. In order to prevent a LED lifetime threatening temperature, the temperature sensor controlling unit can decide to decrease the LED output power to such a level that the junction temperature is tempered and/or to increase the fan speed and thus the cooling capability, or can decide to completely switch off the lamp temporarily.

Since the assimilation lamp is equipped with at least one fan, an attractive and cost effective possibility is created to use the fan's functionality (thus without using the prime illumination function of the lamp) for either the creation or enhanced stimulation of air flows through the greenhouse area in order to improve the mix-up of intentionally injected gas like carbon dioxide. Further, the sole fan functionality can be used during e.g. hot summer days to force down warm air which in a natural way gathers in upper parts of the greenhouse. This causes a mix of warm air with the cooler air in the lower parts of the greenhouse which creates a better micro environment for crop and consequently enhances growth.

The invention claimed is:

1. A stimulating system for plant growth comprising:
an assimilation lighting system configured to provide light and heat, the assimilation lighting system comprising assimilation lamp devices; and
an air heating system configured to provide heated air for stimulating plant growth;
wherein each assimilation lamp device comprises:
a central lamp unit comprising a body and one or more LEDs mounted to a bottom surface of the body, wherein the body is made of a conducting material and acts as a heat sink for heat generated by the LEDs, and wherein each LED is configured to generate light in a desired spectral range for stimulating plant growth;
air stream generating means for generating a device air stream; and
heat transfer and exchange means for transferring heat from the body to the device air stream, so that at least a portion of the heat from the LEDs is used to increase the temperature of the device air stream;
wherein at least a portion of the heat in the device air stream is provided to the air heating system.

2. The stimulating system according to claim 1, wherein the heat transfer and exchange means of each assimilation lamp device comprise a ribbed heat exchanger structure attached to or integral with a top surface of the body; and
wherein the device air stream is in heat exchanging contact with the heat exchanger structure.

3. The stimulating system according to claim 2, wherein the heat exchanger structure is in thermal contact with the body.

4. The stimulating system according to claim 2, wherein the heat exchanger structure is provided with at least one heat conductor for conducting heat from the body to the heat exchanger structure.

5. The stimulating system according to claim 2, wherein the heat exchanger structure includes a plurality of cooling fins extending in planes substantially parallel to the device air stream.

6. The stimulating system according to claim 2, wherein the heat exchanger structure is fitted with a fan.

7. The stimulating system according to claim 2, wherein the device air stream generated by the air stream generating means leaves the heat exchanger structure in a substantial horizontal direction; and
wherein each assimilation lamp device comprises air deflection means for deflecting the device air stream in a vertically downward direction.

8. The stimulating system according to claim 7, wherein the deflection means comprises a guiding hood covering the top surface of the body with the heat exchanger structure.

9. The stimulating system according to claim 8, wherein the heat exchanger structure includes a plurality of cooling fins extending in a longitudinal direction to define a direction of the device air stream; and
wherein the hood is in this direction wider than the body such as to define air stream outlet passages between the body and the hood side wall.

10. The stimulating system according to claim 8, wherein the hood has an air inlet opening arranged above the heat exchanger structure; and
wherein the air stream generating means comprise at least one fan arranged in or below the opening.

11. The stimulating system according to claim 1, wherein the body of each assimilation lamp device comprises a recess accommodating at least one electronic circuit for one or more of controlling, driving and supplying the LEDs.

12. The stimulating system according to claim 1, wherein the body of each assimilation lamp device is made of aluminum.

13. A greenhouse comprising:
an assimilation lighting system; and
an air heating system configured to heat air in the greenhouse and to transport heated air to plants;

wherein the assimilation lighting system comprises assimilation lamp devices for stimulating plant and crop growth, each assimilation lamp device comprising:
 a central lamp unit comprising:
  a body; and
  and one or more LEDs;
  wherein the body comprises a conducting material and acts as a heat sink for heat generated by one or more of the LEDs; and
  wherein each LED is configured to generate light in a desired spectral range for stimulating plant growth;
 an air stream generating means for generating a downward air stream;
 heat transfer and exchange means for transferring heat from the body to the air stream, so that at least a portion of the heat from one or more of the LEDs increases the temperature of the downward air stream, wherein at least a portion of the heat in the downward air stream is provided to the air heating system; and
 a guiding hood comprising:
  a top wall incorporating a raised wall portion and an opening; and
  side walls;
  wherein the air stream generating means is arranged inside the raised wall portion of the top wall; and
  wherein the body and the heat transfer and exchange means are at least partially contained within the guiding hood.

14. The stimulating system for plant growth according to claim 1, wherein the LED-generated heat is not only transported away from the LED but is additive to the air heating system.

15. A greenhouse comprising:
 plants; and
 the stimulating system for plant growth according to claim 1;
 wherein the air heating system is configured to provide heated air to the plants;
 wherein each LED is configured to generate light in a desired spectral range for stimulating plant growth of the plants; and
 wherein each assimilation lamp device is functionally part of the air heating system via providing at least a portion of the heat in the air stream to the air heating system.

16. The greenhouse according to claim 15, wherein the heat transfer and exchange means of each assimilation lamp device comprises a ribbed heat exchanger structure attached to or integral with a top surface of the body.

17. The greenhouse according to claim 15, wherein the heat transfer and exchange means of each assimilation lamp device comprises two ribbed heat exchanger structures one each attached to or integral with opposite sides of the body.

* * * * *